(12) United States Patent
Mathern et al.

(10) Patent No.: US 8,360,214 B2
(45) Date of Patent: Jan. 29, 2013

(54) BRAKE SHOE SUPPORT ASSEMBLY AND METHOD

(75) Inventors: Peter D. Mathern, Greenville, SC (US); Roland S. Moore, Greer, SC (US)

(73) Assignee: Wabtec Holding Corp., Wilmerding, PA (US)

( * ) Notice: Subject to any disclaimer, the term of this patent is extended or adjusted under 35 U.S.C. 154(b) by 406 days.

(21) Appl. No.: 12/421,341

(22) Filed: Apr. 9, 2009

(65) Prior Publication Data
US 2010/0258393 A1 Oct. 14, 2010

(51) Int. Cl.
*B61H 13/36* (2006.01)
*F16D 65/04* (2006.01)

(52) U.S. Cl. ................................ 188/220.1; 188/235

(58) Field of Classification Search .......... 188/234–236, 188/220.1, 205 A, 219.6
See application file for complete search history.

(56) References Cited

U.S. PATENT DOCUMENTS

| | | | |
|---|---|---|---|
| 1,166,521 A | | 1/1916 | Hoke |
| 1,199,932 A | * | 10/1916 | Schwentler ............... 188/206 R |
| 1,509,907 A | | 9/1924 | Schaefer |
| 1,967,478 A | | 7/1934 | Pflager |
| 2,255,728 A | * | 9/1941 | Baselt ....................... 188/206 R |
| 2,299,484 A | | 10/1942 | McCune |
| 2,342,750 A | | 2/1944 | Newell |
| 2,380,376 A | * | 7/1945 | Bachman .................. 188/206 R |
| 2,516,696 A | | 7/1950 | Gothberg |
| 2,545,213 A | * | 3/1951 | Schlegel, Jr. ............... 188/221.1 |
| 2,571,410 A | * | 10/1951 | Blomberg ................. 188/206 R |
| 2,686,576 A | | 8/1954 | Bachman et al. |
| 2,697,498 A | * | 12/1954 | Casey ....................... 188/206 R |
| 2,768,713 A | * | 10/1956 | Tack ......................... 188/205 R |
| 3,621,941 A | | 11/1971 | Blout |
| 3,643,766 A | | 2/1972 | Roush, Jr. |
| 3,696,892 A | * | 10/1972 | Engle ........................... 188/212 |
| 3,721,323 A | * | 3/1973 | Kraus, Jr. ................. 188/206 R |
| 3,743,062 A | | 7/1973 | McIlroy |
| 4,000,792 A | * | 1/1977 | Guldin ......................... 188/242 |
| 4,319,671 A | | 3/1982 | Smith et al. |
| 4,406,444 A | | 9/1983 | Bogenschutz |
| 4,420,065 A | | 12/1983 | Bayliss |
| 4,467,605 A | | 8/1984 | Smith |
| 4,480,722 A | | 11/1984 | Wirth |
| 4,615,417 A | | 10/1986 | Schneider et al. |
| 4,623,050 A | | 11/1986 | Copp |
| 4,630,714 A | | 12/1986 | Stjarne et al. |
| 4,766,980 A | | 8/1988 | Engle |
| 4,802,559 A | | 2/1989 | Fourie et al. |

(Continued)

FOREIGN PATENT DOCUMENTS

JP 9118230 A 5/1997

*Primary Examiner* — Robert A Siconolfi
*Assistant Examiner* — Vishal Sahni
(74) *Attorney, Agent, or Firm* — The Webb Law Firm (57) ABSTRACT

The brake shoe support assembly is able to track the lateral movement of a wheel, typically a wheel on an axle truck that allows lateral wheel movement. In operation, a flange of the wheel pushes on one side of the brake shoe support assembly, pushing it along a pin, and compressing a resilient biasing structure. As the wheel returns to a center or neutral position, the compressed resilient biasing structure expands pushing the brake shoe support assembly back to an original or neutral position. The resilient biasing structure also minimizes the lateral movement of the brake shoe support assembly down the wheel taper under normal braking loads thus preventing shoe ride-off. The resilient biasing structure may be enclosed in a housing adapted to prevent the intrusion of contaminants.

20 Claims, 10 Drawing Sheets

U.S. PATENT DOCUMENTS

| | | | |
|---|---|---|---|
| 5,044,475 A | | 9/1991 | Clark |
| 5,058,712 A | | 10/1991 | Noah |
| 5,062,505 A | * | 11/1991 | Sjarne et al. ............... 188/153 R |
| 5,240,091 A | | 8/1993 | Stjarne |
| 5,242,037 A | | 9/1993 | Stjarne |
| 5,277,280 A | | 1/1994 | Stjarne |
| 5,330,035 A | | 7/1994 | Klimt et al. |
| 5,363,944 A | | 11/1994 | Thiel et al. |
| 5,368,139 A | | 11/1994 | Pirrallo et al. |
| 5,485,899 A | | 1/1996 | Thiel et al. |
| 5,540,310 A | | 7/1996 | Ludtke |
| 5,582,277 A | | 12/1996 | Heidenreich et al. |
| 5,937,974 A | | 8/1999 | Cathcart et al. |
| 6,349,805 B1 | | 2/2002 | Wirth et al. |
| 6,364,428 B1 | | 4/2002 | Labriola et al. |
| 6,374,965 B1 | | 4/2002 | Connolly |
| 6,772,865 B2 | | 8/2004 | Catania |
| 6,938,739 B2 | * | 9/2005 | Korleski et al. ............ 188/220.6 |
| 2001/0045330 A1 | | 11/2001 | Chiang et al. |
| 2004/0124041 A1 | | 7/2004 | Korleski et al. |
| 2006/0049007 A1 | | 3/2006 | Tomita et al. |

\* cited by examiner

BRAKE SHOE SUPPORT ASSEMBLY AND METHOD

CROSS REFERENCE TO RELATED APPLICATIONS

This application incorporates by reference U.S. Pat. No. 4,406,444 to Bogenshutz and U.S. Pat. No. 3,696,892 to Engle relating, respectively, to a railway vehicle braking system and a brake hanger adapted for use in the rail vehicle braking system.

BACKGROUND OF THE INVENTION

1. Field of the Invention

The present invention relates to brake shoe supports for railway vehicles and, more particularly, relates to a brake shoe support permitting a degree of lateral movement of an associated brake shoe to track the lateral movement of a wheel on a railway vehicle truck frame.

2. Description of Related Art

It is well known that there is some periodic lateral movement of a railway truck relative to the truck wheels as, for example, the railway vehicle operates in a curved section of track. In certain early patents, brake hangers are disclosed that bend to permit limited lateral movement of the brake shoes during braking relative to a truck frame to which the hangers are pivotally secured. Such a bendable brake hanger is disclosed, for example, in the U.S. Pat. No. 1,166,521 to Hoke. The brake hanger according to this patent is formed of bar stock in the shape of a closed or an open link, with the laterally spaced sides of the brake hanger being forged to be substantially flat for bending more readily in response to lateral movement of the truck frame relative to the wheels. Such repeated bending tends to crystalize the sides of the brake hanger causing them to create a safety hazard by breaking and permitting the brake rigging to drop on the railway in front of a wheel to possibly cause derailment. These shortcomings are discussed in U.S. Pat. No. 1,509,907 to Schaefer, which provides an improved structure in the form of an articulated brake hanger which requires ball joint connections at the upper and lower ends of the brake hanger to prevent bending of substantially rigid laterally spaced side arms of the brake hanger. These ball joint connections, however, require extra maintenance, and may themselves be sources of breakage upon the freezing up of the joints, and the like.

In U.S. Pat. Nos. 5,277,280; 5,242,037; and 5,240,091, all to Stjärne, a brake hanger is disclosed having a pivot joint comprised of a left support washer, a bushing, and a right support washer. This joint allows two depending hangers to freely rotate or swing and pivot in the direction for applying a brake block on a wheel tread, and in the direction for following a sideways motion of the wheel.

U.S. Pat. No. 4,630,714 to Stjärne et al. discloses a brake block holder that engages an axially moveable wheel. The brake block holder is laterally moveable relative to a brake actuator during braking by means of a pair of pivot hangers, each consisting of a stack of leaf springs.

U.S. Pat. No. 4,406,444 to Bogenschutz discloses a brake hanger comprising an upper lug, a lower lug, and an intermediate leaf spring arrangement. The leaf springs are laterally connected by a bar of resilient material to allow lateral movement of the lower lug relative to the upper lug. U.S. Par. No. 3,643,766 to Roush, Jr. discloses a multiple axle railway vehicle truck that includes brake rigging having a stabilizing means which is resiliently yieldable to permit any of the brake shoes to be deflectable outwardly when they are contacted by their respective wheel flanges upon a sufficient lateral movement of their respective wheel axles.

While brake hangers are known that permit limited lateral movement of the brake shoes during braking relative to a truck frame, improvements in the field of brake hangers that are flexible laterally to accommodate greater lateral movement of a brake shoe are still desirable.

SUMMARY OF THE INVENTION

Generally, as described herein, a brake shoe support assembly, according to embodiments of the invention, is able to track the lateral movement of a wheel, typically a wheel on an axle truck that allows lateral wheel movement. In operation, a flange of the wheel pushes on one side of the brake shoe support assembly pushing it along a pin and compressing a resilient biasing structure. As the wheel returns to the center or neutral position, the compressed resilient biasing structure expands pushing the brake shoe support assembly back to an original position. The resilient biasing structure also minimizes the lateral movement of the brake shoe support assembly down the wheel taper under normal braking loads thus preventing shoe ride-off. The resilient biasing structure may be enclosed in a housing adapted to prevent the intrusion of contaminants.

Generally, a brake shoe support assembly, in one embodiment, comprises a mounting bracket, a hanger body, a brake shoe holder, and a resilient biasing structure. The mounting bracket may be adapted to be attached to a brake actuator. The hanger body is pivotally connected to the mounting bracket and comprises opposing sides defining a receiving pocket therebetween. The brake shoe holder is pivotally connected to the opposing sides by a pivot pin extending between the opposing sides and through a portion of the brake shoe holder. The brake shoe holder is disposed on the pivot pin such that spacing is present in the receiving pocket between the brake shoe holder and one of the opposing sides. The resilient biasing structure is associated with the pivot pin and is disposed in the spacing defined between the brake shoe holder and one of the opposing sides. The resilient biasing structure is operable to return the brake shoe holder to a neutral position after performing a braking operation on a railway vehicle wheel in a curved section of track wherein the resilient biasing structure is compressed by the wheel.

The resilient biasing structure in one embodiment may comprise a plurality of spring washers disposed on the pivot pin. The resilient biasing structure may be housed in an enclosure. The enclosure is disposed in the spacing defined between the brake shoe holder and one of the opposing sides and encloses at least part of the pivot pin. The enclosure may be a multi-piece enclosure, such as an overlapping two-piece enclosure.

In one application, the brake shoe support assembly may be part of a railway vehicle braking system. In such an application, the railway vehicle braking system comprises a railway vehicle brake actuator and a brake shoe support assembly. The brake shoe support assembly generally comprises a mounting bracket, a hanger body, a brake shoe holder, and a resilient biasing structure. The mounting bracket is attached to the brake actuator. The hanger body is pivotally connected to the mounting bracket and comprises opposing sides defining a receiving pocket therebetween. The brake shoe holder is pivotally connected to the opposing sides by a pivot pin extending between the opposing sides and through a portion of the brake shoe holder. The brake shoe holder is disposed on the pivot pin such that spacing is present in the receiving pocket between the brake shoe holder and one of the opposing sides. The resilient biasing structure is associated with the pivot pin and is disposed in the spacing defined between the brake shoe holder and one of the opposing sides. The resilient biasing structure is operable to return the brake shoe holder to a neutral position after performing a braking operation on a railway vehicle wheel in a curved section of track wherein the resilient biasing structure is compressed by the wheel.

The resilient biasing structure in one embodiment may comprise a plurality of spring washers disposed on the pivot pin. The resilient biasing structure may be housed in an enclosure. The enclosure is disposed in the spacing defined between the brake shoe holder and one of the opposing sides and encloses at least part of the pivot pin. The enclosure may be a multi-piece enclosure, such as an overlapping two-piece enclosure.

In another embodiment, a method of assembling a brake shoe support assembly is provided. The method generally comprises providing a mounting bracket, pivotally connecting a hanger body to the mounting bracket, pivotally connecting a brake shoe holder to the hanger body, and associating a resilient biasing structure with the brake shoe holder. The hanger body comprises opposing sides defining a receiving pocket therebetween. The brake shoe holder is pivotally connected to the opposing sides by a pivot pin extending between the opposing arms and through a portion of the brake shoe holder. The brake shoe holder is disposed on the pivot pin such that that spacing is present in the receiving pocket between the brake shoe holder and one of the opposing sides. The resilient biasing structure is associated with the pivot pin so as to be disposed in the spacing defined between the brake shoe holder and one of the opposing sides. The resilient biasing structure is operable to return the brake shoe holder to a neutral position after performing a braking operation on a railway vehicle wheel in a curved section of track wherein the resilient biasing structure is compressed by the action of the wheel.

The resilient biasing structure may comprise a plurality of spring washers disposed on the pivot pin. The method may further comprise a step of enclosing the resilient biasing structure in a protective enclosure. The enclosure may be disposed in the spacing defined between the brake shoe holder and one of the opposing sides and enclose at least part of the pivot ring. The enclosure may be a multi-piece enclosure, such as an overlapping two-piece enclosure.

The method may include mounting the mounting bracket to a brake actuator and operably associating the brake actuator with the hanger body to effect operation of the brake shoe holder.

Further details and advantages will become clear upon reading the following detailed description in conjunction with the accompanying drawing figures.

DESCRIPTION OF THE PREFERRED EMBODIMENTS

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific brake shoe holder and railway vehicle braking system incorporating the same as illustrated in the accompanying drawing figures and described herein are simply exemplary and should not be considered as limiting.

Figure 1:
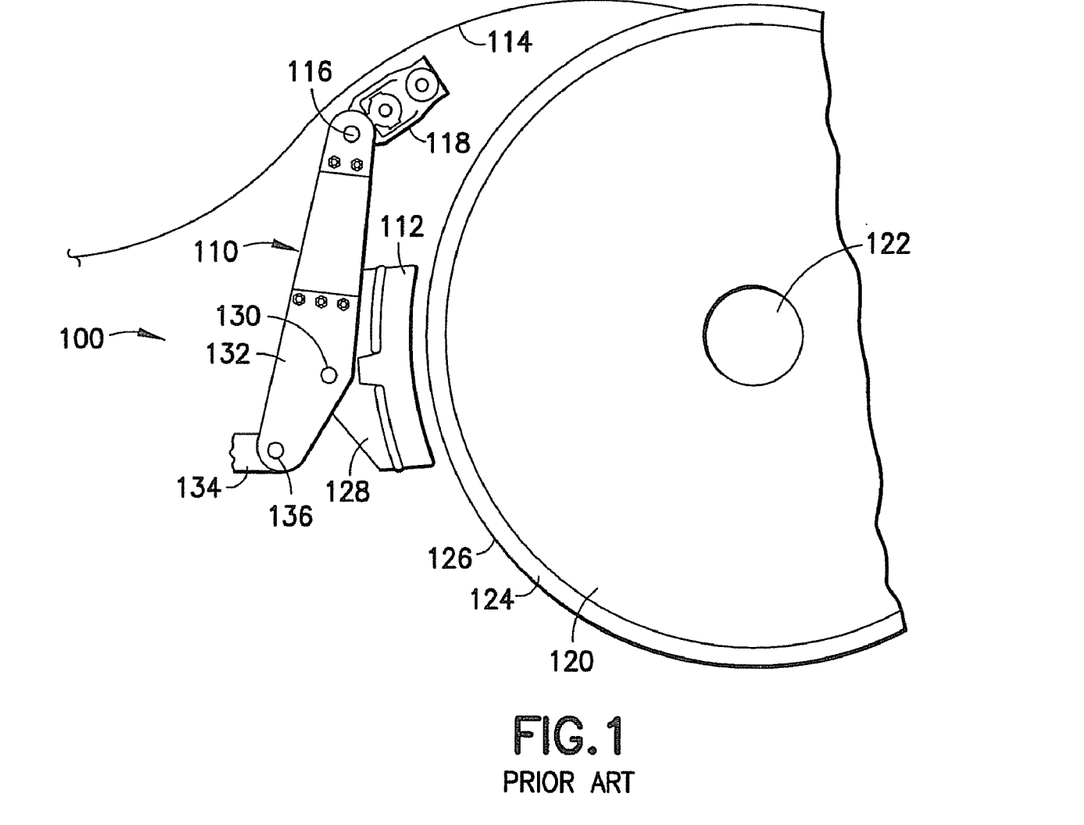
FIG. 1 is an elevational view of a conventional braking system incorporating a known brake shoe holder for a railway vehicle wheel.
Figure 2:
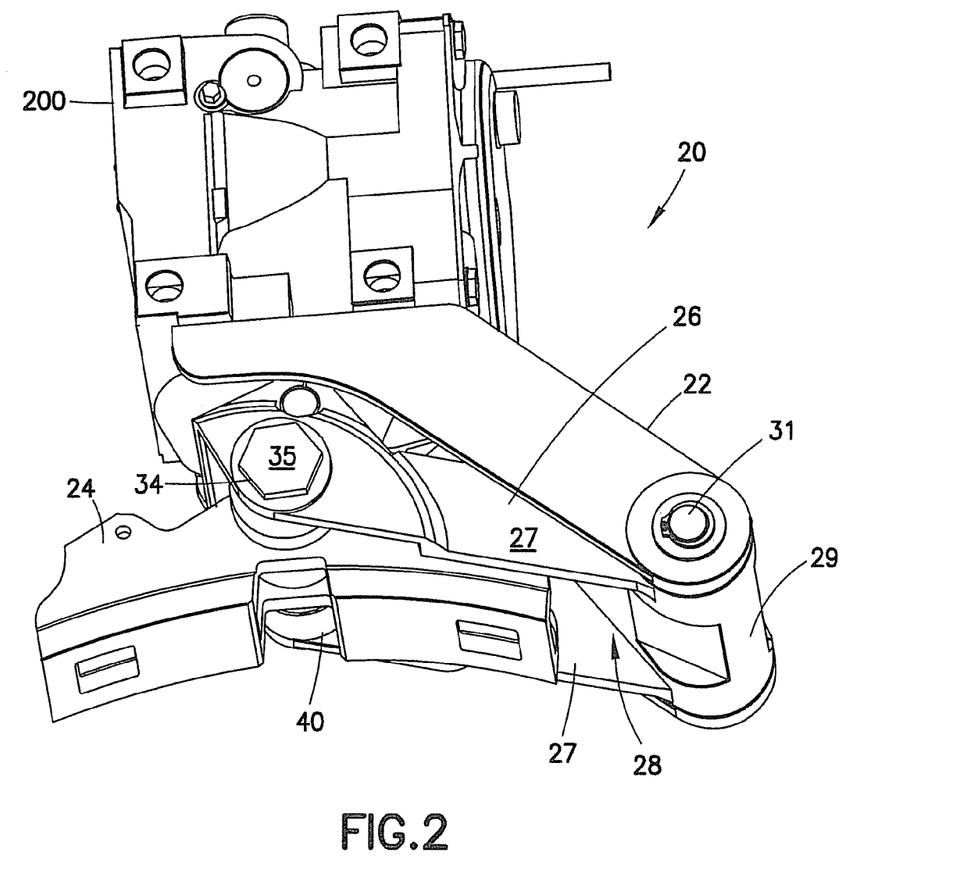
FIG. 2 is a perspective view of an embodiment of a brake shoe support assembly in accordance with the present invention and shown associated with a railway vehicle brake actuator.

A brake shoe support assembly 20, as described herein, can be used, for example, in a braking system 100 such as is shown in FIG. 1 (see also U.S. Pat. No. 3,696,892), or be associated with a railway vehicle brake actuator 200 as shown in FIG. 2 as discussed herein. In conventional brake system 100, a brake shoe support 110 is used for suspending a brake shoe 112 from a side of a truck frame 114. Brake shoe support assembly 20, less certain components as described herein, may generally be used in place of brake shoe support 110 to support brake shoe 112 or a like brake shoe, details of which are described herein. In FIG. 1, truck frame 114 supports brake shoe support 110 via a pivot pin 116 secured to the truck frame 114 at location 118. Truck frame 114 carries a wheel 120 on an axle 122, with wheel 120 having a tapered tread 124 and a flange 126. Brake shoe 112 is pivotally carried by a conventional brake head 128 which, in turn, is pivotally journalled via pivot pin 130 to a support bracket 132. A brake cylinder rod 134 is operably connected to support bracket 132 via pivot pin 136. As described in U.S. Pat. No. 3,696,892 to Engle, brake pressure applied by an extending movement of brake cylinder rod 134 causes application of brake shoe 112 to wheel 120.

FIG. 2 illustrates brake shoe support assembly 20 associated with a railway vehicle brake actuator 200 in accordance with the present invention. Such a brake actuator 200 is conventional in the art and is used to operate the inventive brake shoe support assembly 20 in a conventional manner. As is known by those skilled in the art, railway vehicle brake actuator 200 may be attached to a truck frame such as truck frame 114 shown in FIG. 1 and thereby associate the brake shoe support assembly 20 with wheel 120 in the general arrangement shown in FIG. 1. In this alternative configuration, railway vehicle brake actuator 200 generally takes the place of brake shoe support 110 in the braking system 100 depicted in FIG. 1. As mentioned in the foregoing, brake shoe support assembly 20 may be integrated into the braking system 100 depicted in FIG. 1 whereby the assembly 20, less certain components as described herein, generally takes the place of brake shoe support 110. Accordingly, in this direct application brake shoe support assembly 20 into the braking system 100 certain structural modifications to the assembly 20 are required as discussed herein.

Figure 3:
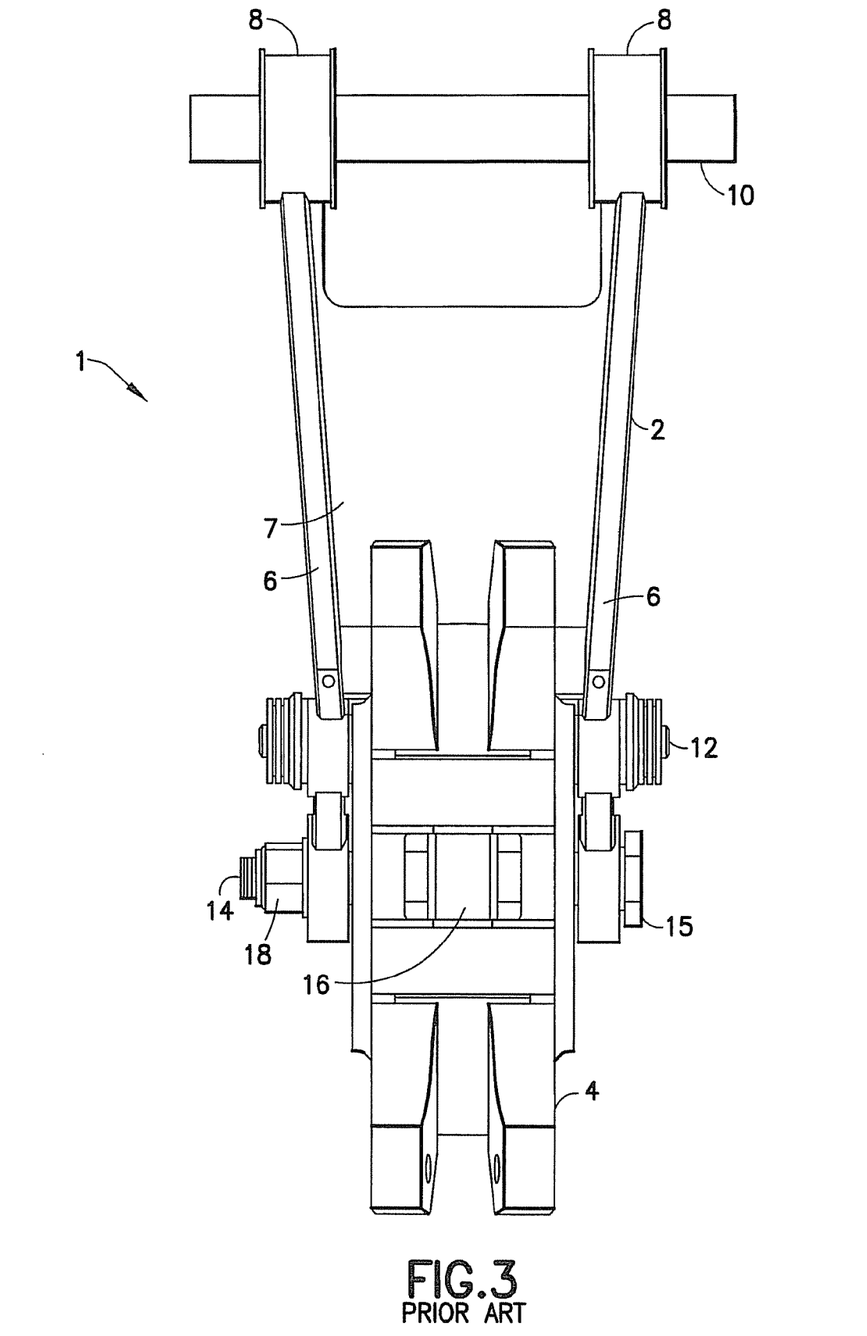
FIG. 3 is a front elevational view of a known brake shoe holder that may be used in the conventional braking system of FIG. 1.

Referring next to FIG. 3, a standard, rigid brake shoe support assembly 1 is shown. Rigid brake shoe support assembly 1 is known for use on truck frames for railway vehicles. In certain railway vehicles, three axle truck frames are provided. The center axle on three axle truck frames typically has increased lateral movement to accommodate curves. The depicted standard, rigid brake shoe support assembly 1 is positioned on the truck frame so that lateral wheel movement does not allow the associated brake shoe to come off the wheel. However, the center axle of a three axle truck frame moves too much to allow the rigid brake shoe support assembly 1 to be positioned on the truck frame so as to keep the brake shoe on the wheel at all times. A brake shoe holder/hanger that can "float" with the wheel is required in this situation to keep the brake shoe in contact with the wheel at all times. Examples of brake hangers that permit limited lateral movement of the brake shoes during braking relative to a truck frame were described previously in this disclosure.

The rigid brake shoe support assembly 1 shown in FIG. 3 will now be further described for background purposes only. Brake shoe support assembly 1 comprises a rigid mounting bracket 2 which is used to attach the support assembly 1 to a truck frame or, alternatively, to a brake actuator unit that is mounted to the truck frame, such as truck frame 114 described in connection with FIG. 1, with mechanical fasteners. A brake shoe holder 4 is suspended from mounting bracket 2. Mounting bracket 2 comprises a rigid hanger body with two opposing sides or arms 6 connected by a web 7. The mounting bracket 2 is pivotally connected via integral cylindrical portions 8 at the end of the respective arms 6 and a pivot pin 10 to a truck frame or, alternatively, a brake actuator unit attached to the truck frame. Suitable mechanical fasteners may be used to secure the pivotal engagement between hanger body 6 and pivot pin 10.

A connection between brake head portion 16 and a brake cylinder rod, for example, brake cylinder rod 134 shown in FIG. 1 is used to apply a brake force to brake shoe holder 4 in the manner generally described previously in connection with FIG. 1. A pin 12 is provided for the connecting the mounting bracket 2 and brake shoe holder 4 and stabilizing this connection. Brake shoe holder 4 is also pivotally connected to opposing arms 6 via a second pin 14 comprising a head 15. Pin 14 passes through opposing arms 6 and through brake head portion 16 of brake shoe holder 4. A terminal end of the pin 14 may be threaded to accept a nut 18 or like mechanical fastener to secure the pin 14 relative to brake head portion 16 of brake shoe holder 4. The rigidity provided by mounting brake 2 and opposing arms 6 makes the conventional brake shoe assembly 1 of FIG. 3 a "rigid" assembly as noted in the foregoing description.

Referring further to FIGS. 4-9, brake shoe support assembly 20, according to one presently preferred embodiment of the invention, is shown. The brake shoe support assembly 20 comprises a mounting bracket 22, shown in isolation in FIG. 6, in the general form of an open-sided casing which is adapted to be attached to brake actuator 200 shown in FIG. 2 which, in turn, is attached to a truck frame, such as truck frame 114 described in connection with FIG. 1. In this configuration, brake actuator 200 generally takes the place of brake shoe support 110. Mounting bracket 22 comprises a series of attachment bushings or elements 23 for mechanical interconnection to the brake actuator 200. If desired, as an alternative, mounting bracket 22 may be omitted from brake shoe support assembly 20 so that the assembly 20, less mounting bracket 22, may be suitable for direct attachment to truck frame 114 shown in FIG. 1. This alternative also eliminates brake actuator 200 and the brake shoe support assembly 20 is operated by brake cylinder rod 134 in a manner similar to that described in U.S. Pat. No. 3,696,892 to Engle and described in the foregoing in connection with FIG. 3.

Figure 7:
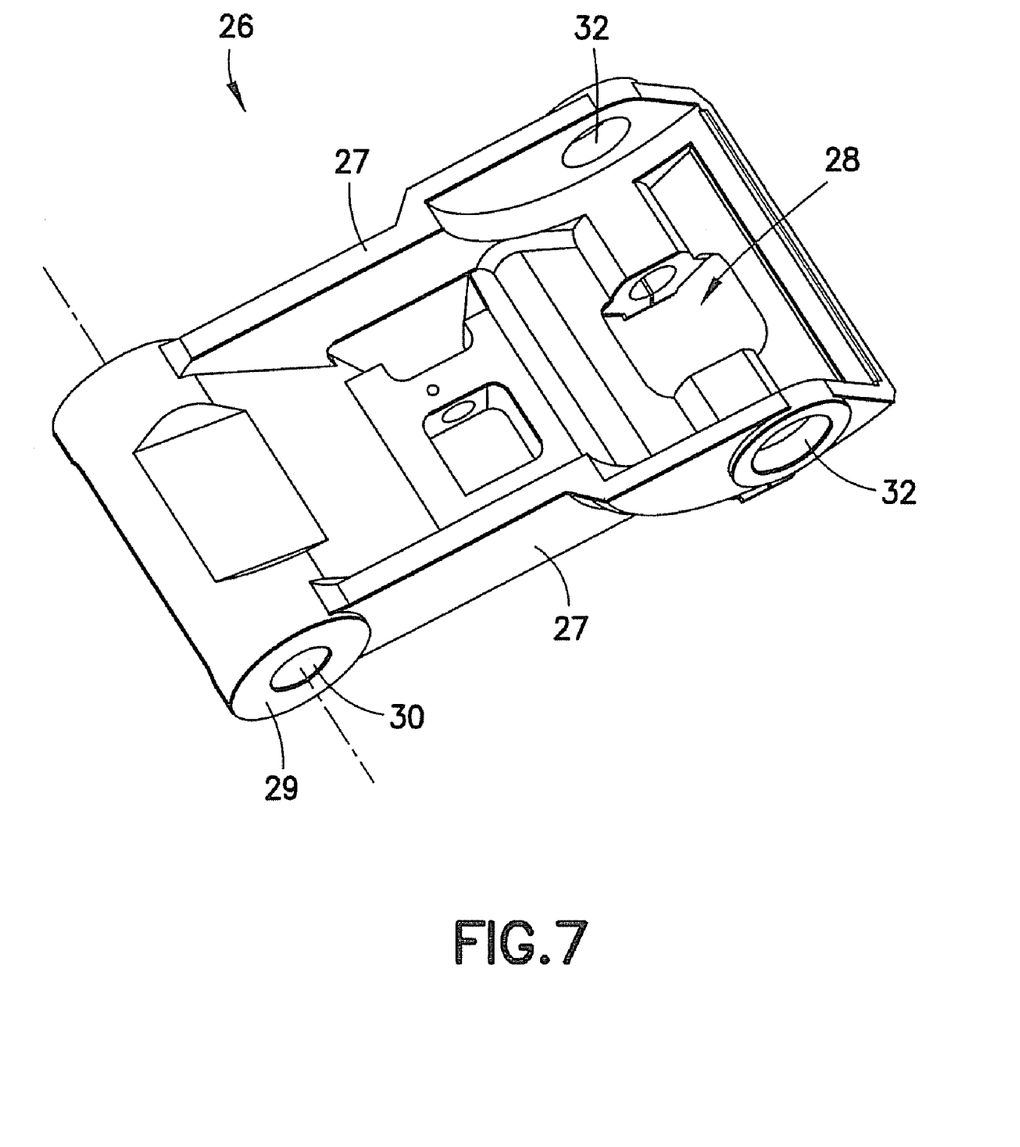
FIG. 7 is a perspective view of a hanger body used in the brake shoe support assembly shown in FIG. 4.
Figure 8:
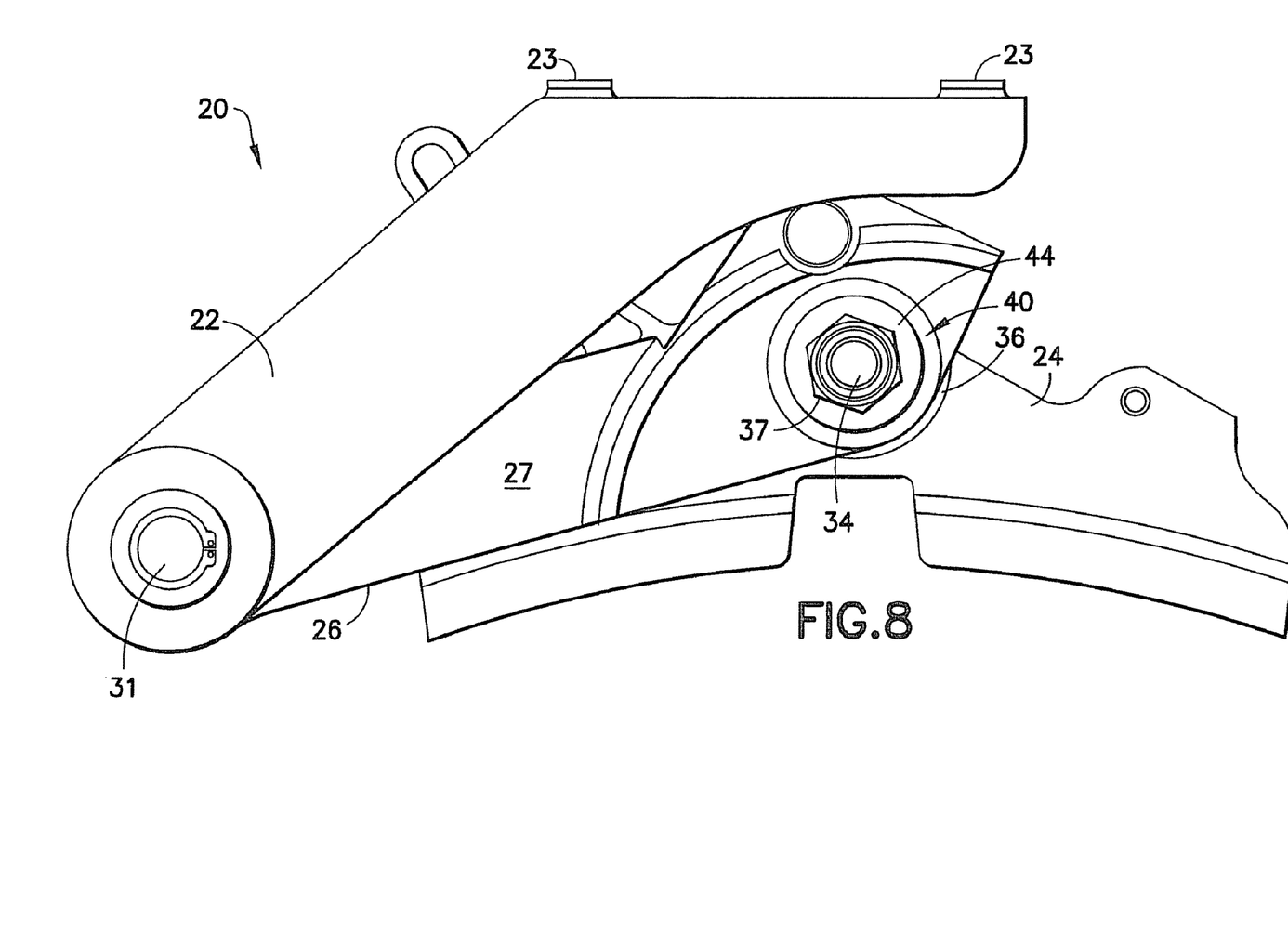
FIG. 8 is an elevational side view of the in the brake shoe support assembly shown in FIG. 4.
Figure 9A:
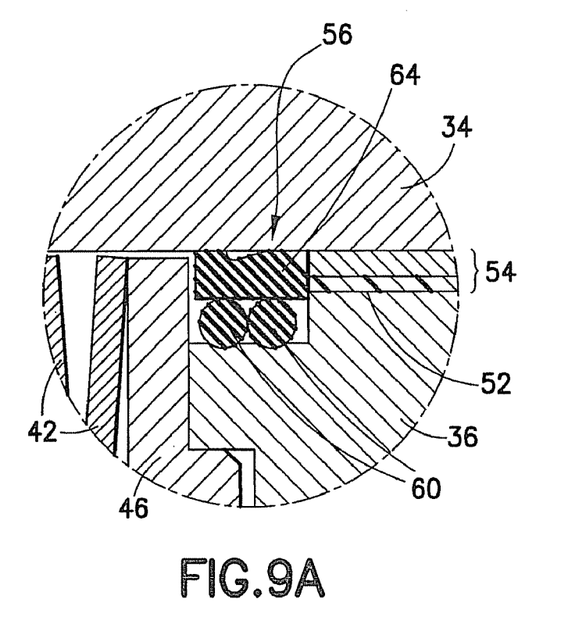
FIG. 9A is a detail view of Detail 9A in FIG. 5.
Figure 9B:
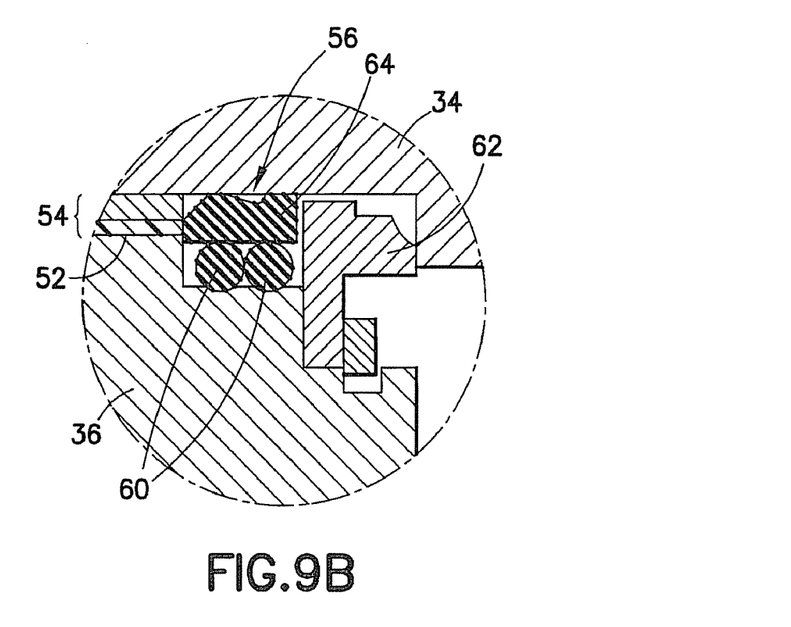
FIG. 9B is a detail view of Detail 9B in FIG. 5.

A brake shoe holder 24 is suspended from mounting bracket 22 via a hanger body 26, an isolation bottom view of which is found in FIG. 7. In FIG. 7, brake shoe holder 24 is intended to be supported between opposing sides 27 of the hanger body 26 which define a receiving pocket 28 therebetween for receiving and supporting portions of the brake shoe holder 24 therein. The hanger body 26 is pivotally connected to the mounting bracket 22 via a cylindrical support portion 29 which defines a center bore 30 that accepts a pivot pin 31 which passes through the mounting bracket 22 and cylindrical support portion 29. Suitable mechanical fasteners may be provided on opposing ends of pivot pin 31 to secure the pivotal engagement between hanger body 26 and mounting bracket 22.

Opposing sides 27 of hanger body 26 define a pair of opposed openings 32 to accept a second pivot pin 34 comprising a head 35. Pivot pin 34 passes through the opposing openings 32 in opposing sides 27 of hanger body 26 and through a brake head portion 36 of brake shoe holder 24. A bushing 33 may be provided within each opening 32 to support the pivot pin 34 in the openings 32. A terminal end of the pivot pin 34 may be threaded to accept a nut and washer combination 37 or like mechanical fasteners to secure the pivot pin 34 between opposing sides 27 and thereby permit pivotal movement of brake shoe holder 24 relative to hanger body 26. As shown in FIG. 7, opposing sides 27 project somewhat outwardly at the end of hanger body 26 opposite the cylindrical support portion 29 to provide spacing on either side of brake shoe holder 24 for pivotal operation of the brake shoe holder 24 and to permit lateral movement of the brake shoe holder 24 on pivot pin 34 as described herein. It will be clear from FIGS. 4-9 that, if it is desired to omit mounting bracket 22 and brake actuator 200 and mount hanger body 26 directly to a truck frame, such as truck frame 114 shown in FIG. 1, cylindrical support portion 29 may be pivotally connected to the truck frame 114 at pivot point 116 shown in FIG. 1. In this configuration, cylinder rod 134 shown in FIG. 1 interfaces with hanger body 26 via pivot pin 31 in a manner similar to that described in the foregoing Engle patent.

Figure 4:
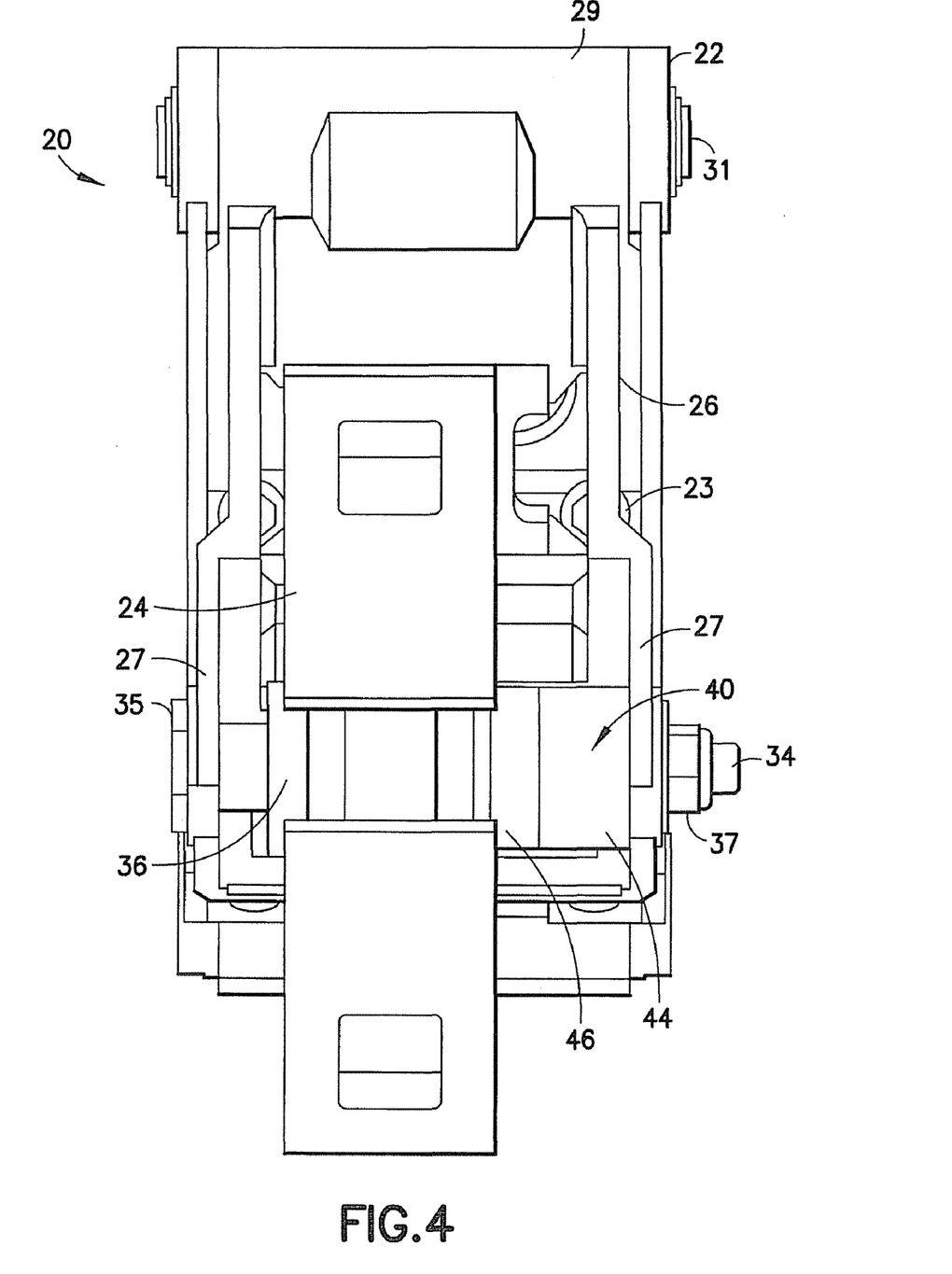
FIG. 4 is an elevational view of the brake shoe support assembly shown associated with the railway vehicle brake actuator in FIG. 2.

Desirably, pivot pin 34 comprises an enlarged portion 38 adjacent head 35 which defines a pin shoulder 39 that limits lateral movement of brake shoe holder 24 on pivot pin 34 in one direction; in the view shown in FIG. 4, lateral movement of brake shoe holder 24 is limited by pin shoulder 39 to the right. The receiving pocket 28 defined by hanger body 26 is sufficient in size to allow a resilient biasing structure 40 to be associated with the brake shoe holder 24 as well as receive and support the brake shoe holder 24 therein. The resilient biasing structure 40 accommodates or allows lateral movement of the brake shoe holder 24 to the left in the view shown in FIG. 5 (e.g., left side spacing). In one embodiment, this biasing structure may comprise a series of spring washers 42 disposed on pivot pin 34 which act between left side 27 of hanger body 26 and the left side of brake shoe holder 24 in the view shown in FIG. 5.

Figure 5:
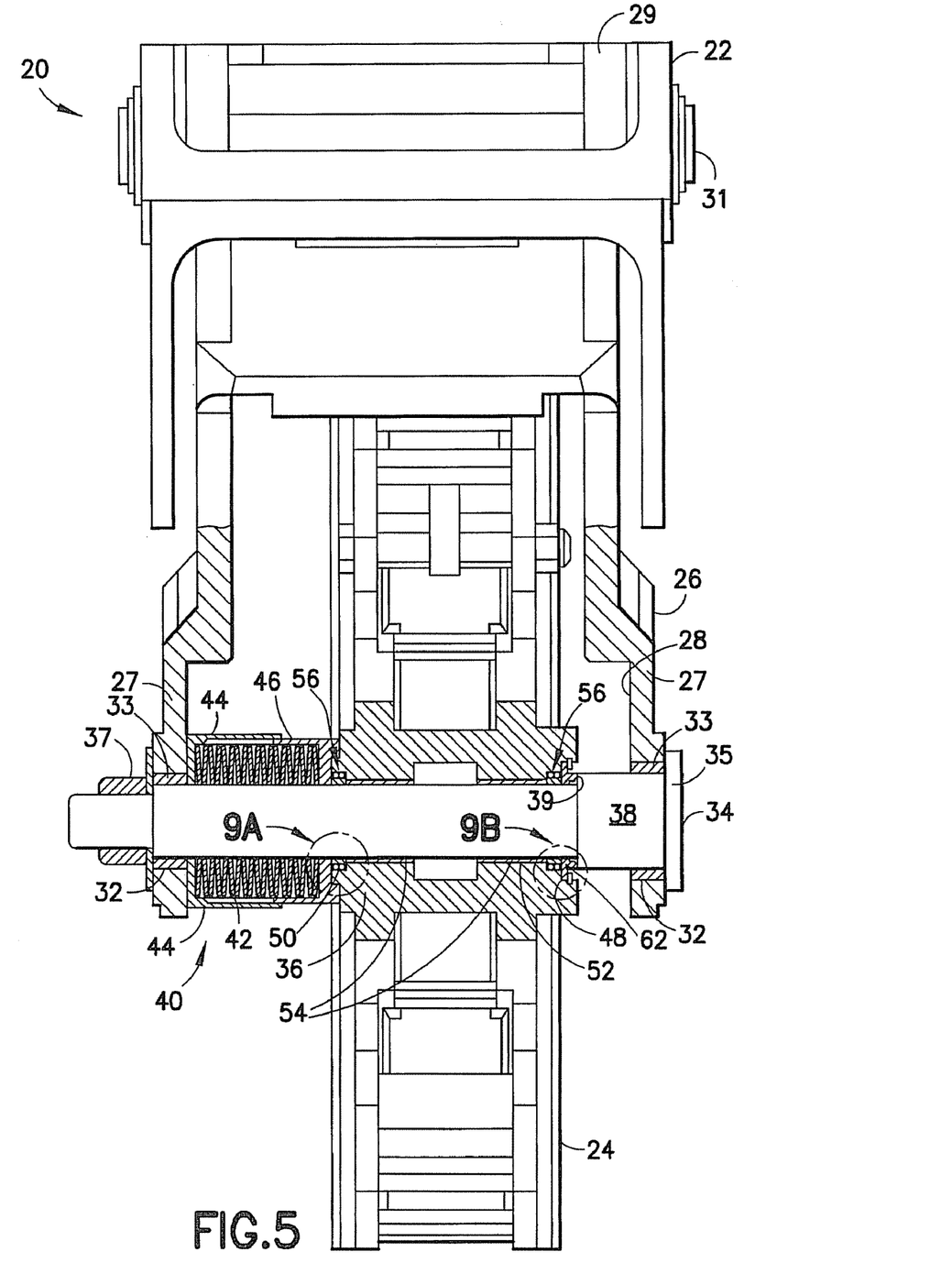
FIG. 5 is an elevational and partial cross-sectional view of the embodiment of the brake shoe support assembly shown in FIG. 4.
Figure 6:
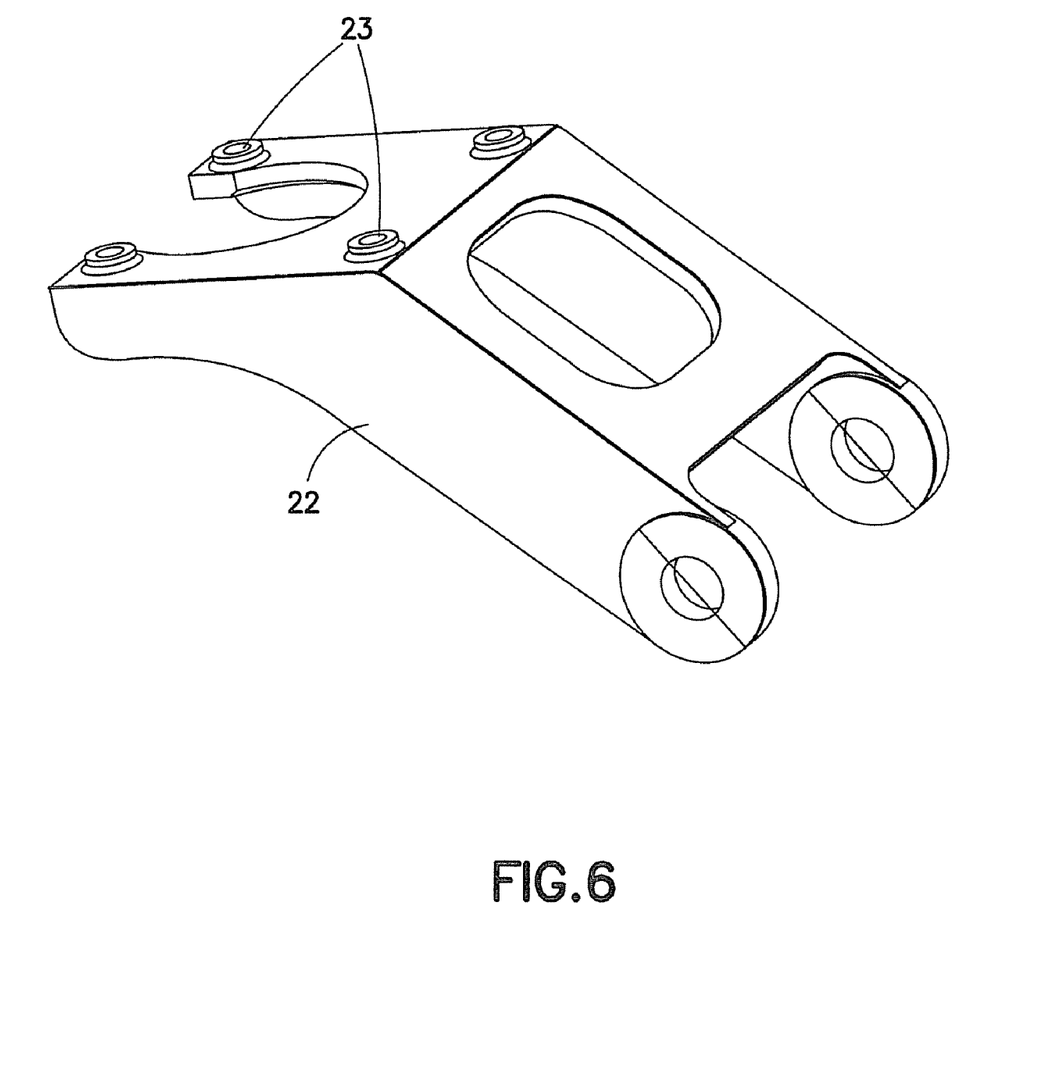
FIG. 6 is a perspective view of a mounting bracket used in the brake shoe support assembly shown in FIG. 4.

The presence of spring washers 42 allows the brake shoe holder 24 to track the lateral movement of a wheel such as wheel 120 in FIG. 1, particularly when used on a three axle truck frame as described previously. Two different configurations have been described in the foregoing description for incorporating brake shoe support assembly 20 generally into the braking system shown in FIG. 1 (e.g., via direct integration into this system or by attachment to brake actuator 200 which supplant portions of this prior art system) and both configurations may incorporate the lateral-movement accommodating feature provided by the resilient biasing structure 40 in accordance with this disclosure. In operation, the flange 126 of wheel 120 pushes on the right side of brake shoe holder 24, pushing the brake shoe holder 24 along pivot pin 34 and thereby compressing spring washers 42. As the wheel 120 returns to a centered or neutral position, for example, after performing a braking operation on a curved section of track, the compressed spring washers 42 act upon the brake shoe holder 24 to return the brake shoe holder 24 back to its original state, generally as shown in FIG. 5. The spring washers 42 are also useful for minimizing lateral movement of the brake shoe holder 24 down the wheel taper 124 under normal braking conditions thus preventing brake shoe ride-off. Also, the ability to preload the brake shoe holder 24 in its normal position is a desirable design feature. The prior art designs discussed previously that simply have a flexible hanger are less desirable in that the wheel taper 124 will deflect the flexible hanger laterally during normal braking. The resilient biasing structure 40 helps minimize the lateral movement of the brake shoe holder 24 down the wheel taper 124 under normal braking loads thus preventing shoe ride-off.

Desirably, the spring washers 42 are housed in a two-piece enclosure comprising a first or left side portion 44 and a second or right side portion 46 which are overlapped to prevent intrusion of environmental contaminates. Seals may be provided in enclosure 44, 46 to keep their mutually engaging sliding surfaces clean. Accordingly, brake shoe holder 24 is permitted some lateral movement along pivot pin 34 during a curve-braking situation. The spring washers 42 allow the brake shoe holder 24 to be pushed by the wheel flange 126 during a curve-braking situation. Once the brakes are released, the spring washers 42 act to return the brake shoe holder 24 to its original condition or state. While the foregoing discussion relates to spring washers 42 as the resilient biasing structure 40 on pivot pin 34, other equivalent mechanical devices may be used, such as a coil spring, a resiliently deformable bushing or like structure disposed on pivot pin 34, or even leaf springs acting between the left side 27 of hanger body 26 and the body of the brake shoe holder 24 may be used in place of spring washers 42. This listing is intended to be non-exhausting and non-limiting and is provided for exemplary purposes.

Finally, brake head portion 36 of brake shoe holder 24 may define lateral recessed areas 48, 50 and brake head portion 36 further defines a central bore 52 extending between the lateral recessed areas wherein pivot pin 34 is disposed. A pair of low friction bushings 54 may be disposed in central bore 52 to rotationally support pivot pin 34. Seals 56 are disposed in the respective recessed areas 48, 50 and comprise O-rings 60 for sealing central bore 52 from the external environment. The O-rings 60 disposed on the right side of pivot pin 34 in the view of FIG. 5 are secured and sealed in recessed area 48 by an end cover 62 and the right-side O-rings 60 are sealed in recessed area 50 by the overlapped enclosure 44, 46 housing spring washers 42. End cover 62 also provides a stop for the break head portion 36. An O-ring retainer ring 64 may be used with the two O-rings 60 in each recessed area 48, 50 to further seal central bore 52 from external conditions.

Figure 10:
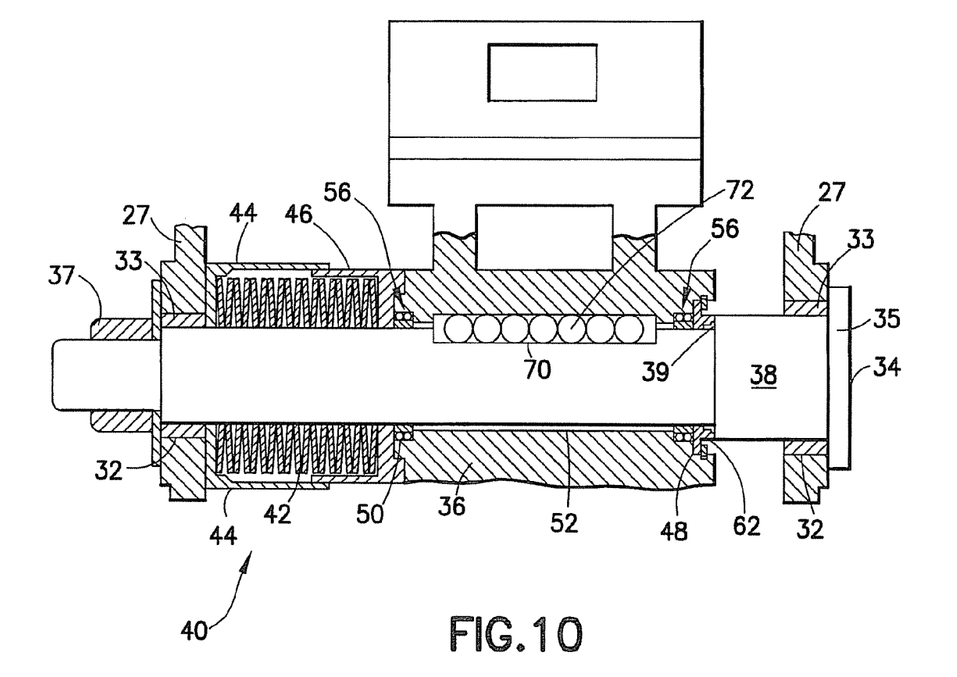
FIG. 10 is a cross-sectional view of a portion of the brake shoe support assembly shown in FIG. 5 illustrating a variation in the embodiment.

Desirably, bushings 54 are low friction bushing-bearings such as DX® bearings manufactured by GG Bearings Technology. These bushing-bearings 54 are metal bushings with an interior layer of acetal polymer; the DX® bearings manufactured by GG Bearings Technology are an example of suitable bushing-bearings for application in this disclosure. The pivot pin 34 is desirably highly polished to minimize friction with bushing-bearings 54. An alternative to using such low friction bushing-bearings for bushings 54 is shown in FIG. 10. In FIG. 10, a flat 70 is machined on the pivot pin 34 and vertical rollers 72 are provided between the pin pivot 34 and the brake head portion 36. The alternative embodiment shown in FIG. 7 may be termed a linear ball bushing bearing as this alternative incorporates rolling elements 72 between the brake head portion 36 and the pivot pin 34.

While embodiments of a brake shoe support assembly for a railway vehicle truck were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A brake shoe support assembly, comprising:
a mounting bracket;
a hanger body pivotally connected by a first pivot pin to the mounting bracket and comprising opposing sides defining a receiving pocket therebetween;
a brake shoe holder pivotally connected to the opposing sides by a second pivot pin extending between the opposing sides and through a portion of the brake shoe holder, the brake shoe holder disposed on the second pivot pin such that spacing is present in the receiving pocket between the brake shoe holder and one of the opposing sides and such that the brake shoe holder is capable of lateral movement on the second pivot pin; and
a resilient biasing structure mounted on the second pivot pin and disposed in the spacing defined between the brake shoe holder and one of the opposing sides, the resilient biasing structure allowing the brake shoe holder to track the lateral movement of a railway vehicle wheel and returns the brake shoe holder to a neutral position on the second pivot pin after performing a braking operation on the wheel in a curved section of track wherein the resilient biasing structure is compressed by the wheel as the brake shoe holder moves laterally on the second pivot pin.

2. A brake shoe support assembly as claimed in claim 1, wherein the resilient biasing structure comprises a plurality of spring washers disposed on the second pivot pin.

3. A brake shoe support assembly as claimed in claim 1, wherein the resilient biasing structure is housed in an enclosure.

4. A brake shoe support assembly as claimed in claim 3, wherein the enclosure is disposed in the spacing defined between the brake shoe holder and one of the opposing sides and encloses at least part of the second pivot pin.

5. A brake shoe support assembly as claimed in claim 3, wherein the enclosure is a multi-piece enclosure.

6. A brake shoe support assembly as claimed in claim 5, wherein the multi-piece enclosure comprises an overlapping two-piece enclosure.

7. A railway vehicle braking system, comprising:
a railway vehicle brake actuator; and
a brake shoe support assembly, comprising:
a mounting bracket attached to the brake actuator;

a hanger body pivotally connected by a first pivot pin to the mounting bracket and comprising opposing sides defining a receiving pocket therebetween;

a brake shoe holder pivotally connected to the opposing sides by a second pivot pin extending between the opposing sides and through a portion of the brake shoe holder, the brake shoe holder disposed on the second pivot pin such that spacing is present in the receiving pocket between the brake shoe holder and one of the opposing sides and such that the brake shoe holder is capable of lateral movement on the second pivot pin; and a resilient biasing structure mounted on the second pivot pin and disposed in the spacing defined between the brake shoe holder and one of the opposing sides, the resilient biasing structure allowing the brake shoe holder to track the lateral movement of a railway vehicle wheel and returns the brake shoe holder to a neutral position on the second pivot pin after performing a braking operation on the wheel in a curved section of track wherein the resilient biasing structure is compressed by the wheel as the brake shoe holder moves laterally on the second pivot pin.

8. A railway vehicle braking system as claimed in claim 7, wherein the resilient biasing structure comprises a plurality of spring washers disposed on the second pivot pin.

9. A railway vehicle braking system as claimed in claim 7, wherein the resilient biasing structure is housed in an enclosure.

10. A railway vehicle braking system as claimed in claim 9, wherein the enclosure is disposed in the spacing defined between the brake shoe holder and one of the opposing sides and encloses at least part of the second pivot pin.

11. A railway vehicle braking system as claimed in claim 9, wherein the enclosure is a multi-piece enclosure.

12. A railway vehicle braking system as claimed in claim 11, wherein the multi-piece enclosure comprises an overlapping two-piece enclosure.

13. A method of assembling a brake shoe support assembly, comprising:

providing a mounting bracket;

pivotally connecting a hanger body to the mounting bracket by a first pivot pin, the hanger body comprising opposing sides defining a receiving pocket therebetween;

pivotally connecting a brake shoe holder to the opposing sides by a second pivot pin extending between the opposing arms and through a portion of the brake shoe holder, the brake shoe holder disposed on the second pivot pin such that that spacing is present in the receiving pocket between the brake shoe holder and one of the opposing sides and such that the brake shoe holder is capable of lateral movement on the second pivot pin; and mounting a resilient biasing structure on the second pivot pin so as to be disposed in the spacing defined between the brake shoe holder and one of the opposing sides, the resilient biasing structure allowing the brake shoe holder to track the lateral movement of a railway vehicle wheel and returns the brake shoe holder to a neutral position on the second pivot pin after performing a braking operation on the wheel in a curved section of track wherein the resilient biasing structure is compressed by the wheel as the brake shoe holder moves laterally on the second pivot pin.

14. A method as claimed in claim 13, wherein the resilient biasing structure comprises a plurality of spring washers disposed on the second pivot pin.

15. A method as claimed in claim 13, further comprising enclosing the resilient biasing structure in a protective enclosure.

16. A method as claimed in claim 15, wherein the enclosure is disposed in the spacing defined between the brake shoe holder and one of the opposing sides and encloses at least part of the second pivot pin.

17. A method as claimed in claim 15, wherein the enclosure is a multi-piece enclosure.

18. A method as claimed in claim 17, wherein the multi-piece enclosure comprises an overlapping two-piece enclosure.

19. A method as claimed in claim 13, further comprising mounting the mounting bracket to a brake actuator.

20. A method as claimed in claim 19, further comprising operably associating the brake actuator with the hanger body to effect operation of the brake shoe holder.

\* \* \* \* \*

UNITED STATES PATENT AND TRADEMARK OFFICE
CERTIFICATE OF CORRECTION

PATENT NO. : 8,360,214 B2
APPLICATION NO. : 12/421341
DATED : January 29, 2013
INVENTOR(S) : Peter D. Mathern et al.

Page 1 of 1

It is certified that error appears in the above-identified patent and that said Letters Patent is hereby corrected as shown below:

In the Claims:

Column 10, Line 9, Claim 13, before "spacing" delete "that"

Signed and Sealed this
Sixteenth Day of April, 2013

Teresa Stanek Rea
*Acting Director of the United States Patent and Trademark Office*